Aug. 21, 1951            C. R. BROWN            2,564,671
VARIABLE THRUST EXHAUST NOZZLE
Filed April 19, 1948
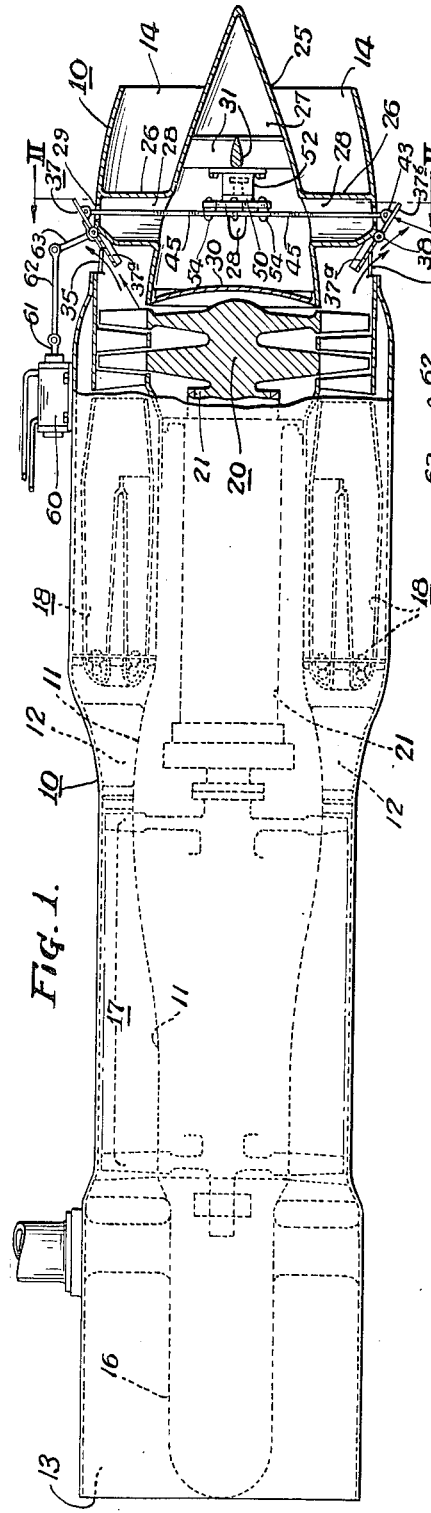
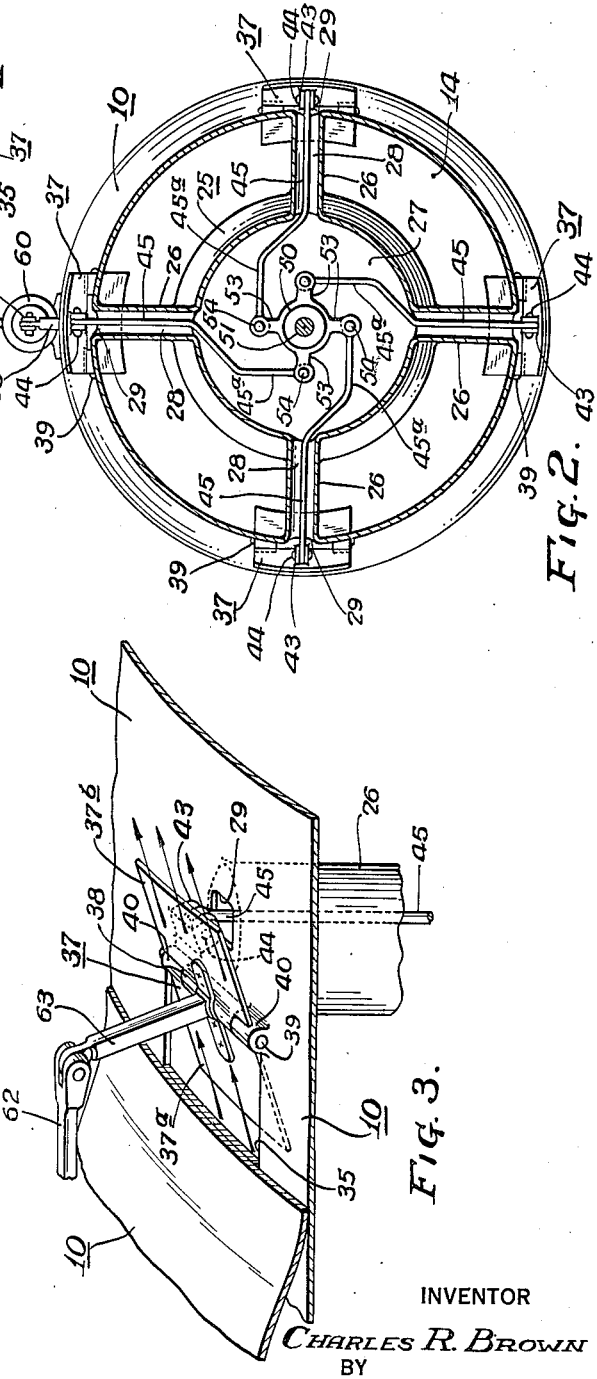
INVENTOR
*Charles R. Brown*
BY
ATTORNEY Patented Aug. 21, 1951

2,564,671

UNITED STATES PATENT OFFICE 2,564,671

VARIABLE THRUST EXHAUST NOZZLE

Charles R. Brown, Glen Mills, Pa., assignor to Westinghouse Electric Corporation, East Pittsburgh, Pa., a corporation of Pennsylvania Application April 19, 1948, Serial No. 21,791

3 Claims. (Cl. 60—35.6)

This invention relates to gas turbine power plants, and more particularly to a power plant of the turbojet type designed for propulsion of aircraft.

In the operation of a gas turbine power plant such as the aviation type comprising a turbine-driven compressor, fuel combustion apparatus and discharge nozzle, it is sometimes desirable to effect a reduction in the thrust output without materially reducing the rotational speed of the turbine and compressor. In this way thrust may be destroyed for retarding forward speed of the aircraft while power or rapid acceleration is still available in the event of sudden need, as in the case of a plane approaching a carrier and encountering a wave-off signal. It has been proposed to provide means operative to effect a reduction in thrust by enlarging the flow area of a nozzle of the turbojet apparatus, thus reducing back pressure on the turbine as well as reducing the velocity of gases discharged through the nozzle.

One object of the present invention is to provide an improved gas turbine discharge nozzle structure in which an auxiliary vent means is available for discharging gases laterally and radially with respect to the axis of normal flow to the nozzle, thereby expending sufficient energy from the discharged gases to reduce the pressure and thrust of the axial jet.

Another object of the invention is the provision of a gas turbine engine including an outer cylindrical casing and central core structure forming an annular turbine exhaust nozzle, a plurality of closure plates pivotally mounted in lateral discharge apertures formed in the casing structure, motor means operatively connected to one of the closure plates, and a rotary spindle mounted in the core structure and operatively connected to the respective closure plates, so that equalized adjustment of all closure plates can be effected simultaneously through the medium of the single motor means.

A further object of the invention is the provision of thrust destroying apparatus having the aforementioned advantages, and embodying features of construction rendering the apparatus readily operable under the high temperature operating conditions to which a gas turbine engine is subjected.

These and other objects are effected by the invention as will be apparent from the following description and claims taken in connection with the accompanying drawing, forming a part of this application, in which:

Figure 1 is a diagrammatic elevational view, partly in section, of a gas turbine power plant equipped with thrust destroying apparatus constructed in accordance with the invention;

Figure 2 is an enlarged-detail sectional view taken substantially along the line II—II of Figure 1; and Figure 3 is a fragmentary perspective view of the uppermost closure plate and associated elements of the apparatus shown in Figure 1.

The gas turbine power plant illustrated in Figure 1 is typical of the type of engine with which the invention is adapted to be associated, and comprises an outer streamlined, generally cylindrical casing structure 10 in which is mounted an inner sectional core structure 11, both casing structures coacting to form an annular passageway 12 which extends longitudinally through the engine from a forward air intake opening 13 to a rearwardly disposed exhaust or jet nozzle 14. The casing structure 10 is adapted to be mounted on or in the fuselage or wing of the aircraft with the intake opening 13 pointed in the direction of flight, and with a substantial portion of the casing structure adjacent the nozzle 14 spaced away from the other parts of the plane. Mounted within the casing structure 10 along the longitudinal axis thereof are a fairing section 16 which may house auxiliary control apparatus (not shown), a multiple-stage axial-flow compressor 17, annular fuel combustion apparatus 18, and a turbine 20, the rotor of which is operatively connected to the rotor of the compressor 17 through the medium of a shaft 21 journaled within the core structure 11.

In accordance with the well-known principle of operation of a gas turbine power plant, air entering the intake opening 13 is compressed by the compressor 17 and delivered to the combustion apparatus 18 to support combustion of fuel, creating heated motive fluid which is expanded through the turbine 20 for driving the compressor. Motive fluid discharged from the turbine 20 is then vented through the nozzle 14 in the form of an axially directed jet establishing a propulsive thrust.

In the embodiment of the power plant shown in Figure 1, the inner core structure 11 includes a terminal core or fairing section 25, which is supported concentrically within the nozzle 14 through the medium of a plurality of radially disposed struts 26. Four such struts are illustrated. The core section 25 is hollow, having formed therein a chamber 27 which communicates through passages 28 in the struts with apertures 29 formed in the outer casing structure 10. The fairing section 25 further comprises a forwardly disposed end wall 30, which is located adjacent the turbine 20, and carries an internal spider portion 31 which includes a number of radial arms connected to the interior wall of the section.

According to the invention, the portion of the outer casing structure 10 extending rearwardly of the turbine 20 and surrounding the nozzle 14 has formed therein a plurality of auxiliary lateral vent openings 35, there being four such openings in the apparatus chosen for illustration, as best shown in Figure 2. The lateral vent openings 35 are thus preferably, equally spaced circumferentially in the annular wall of the casing structure 10 in advance of the nozzle 14, and are disposed adjacent the respective radial struts 26. Pivotally mounted on suitable pins carried by the casing structure 10 are a plurality of movable closure elements or plates 37, each of which is adapted to be operated to open or close one of the vent openings 35 in accordance with desired operation of the gas turbine engine, as hereinafter explained. Referring to Figure 3, the uppermost closure plate 37 and associated elements of the apparatus shown in Figure 1 is illustrated in enlarged detail, it being understood that this closure plate is representative of the similar elements which are adapted to be jointly operable therewith as shown in Figure 2.

As shown in Figure 3, the substantially flat closure plate 37 has a centrally disposed hinge portion 38 which is adapted to be rotatably mounted on a pin 39 that is carried on a pair of lugs 40 projecting from the casing structure 10. In this form of the invention, a valve portion 37a of the closure plate 37 is adapted to be moved into and out of closing relation with the vent opening 35 in accordance with tilting of the plate about the laterally disposed pin 39. The closure plate 37 also includes a rearwardly extending guide portion 37b, which is adapted to lie substantially flush with the outer surface of the casing structure 10 when the portion 37a is in the position for closing the opening 35. The guide portion 37b serves in the open position of the closure plate to guide turbine exhaust gases outwardly and away from the casing structure. Secured to the lower face of the guide portion 37b is a lug 43, which carries a pin 44 to which is secured the outer end of a connecting rod 45, which is adapted to extend through the adjacent opening 29 in the casing structure 10.

As best shown in Figure 2 of the drawing, each of the connecting rods 45 associated with the respective closure plates 37 extends radially inwardly through the passage 28 in the associated strut 26 and terminates in a suitably offset inner end 45a within the chamber 27 of the core section 25. Within the chamber 27 an axially rotatable spindle 50 is journaled on a pin 51, which is mounted in a suitable housing 52 supported on the spider member 31, as shown in Figure 1. Referring again to Figure 2, the spindle element 50 has formed thereon four radially disposed lugs 53, which are pivotally connected by pins 54 to the ends 45a of the corresponding connecting rods 45, respectively. It will be noted that each of the connecting rods 45 is thus connected to the associated lug 53 in such a manner as to provide a moment about the pin 51, upon partial rotation of the spindle 50. Thus, with the closure plates 37 disposed in open position, as illustrated in Figure 2, partial rotation of the spindle 50 in a counterclockwise direction will effect radial inward movement of the respective connecting rods 45 for tilting the closure plates to their closed positions. Subsequent opening movement of the closure plates 37 can be effected by clockwise rotation of the spindle 50 and radially outward shifting of the respective connecting rods 45.

As shown in Figure 1, a single motor device 60 may be provided for effecting simultaneous operation of all of the closure plates 37. The motor device 60 may be of any suitable construction, and in the embodiment chosen for illustration, comprises a fluid pressure device having a plunger 61 operatively connected to the uppermost closure plate 37 through the medium of a link 62 and an operating arm 63, one end of which is welded or otherwise secured to the upper surface of the closure plate adjacent the hinge portion 38 (see Figure 3).

In operation, when it is desired to effect a reduction in the thrust output of gases issuing through the nozzle 14, the motor device 60 is operated to effect forward movement of the plunger 61 and link 62, thereby causing the arm 63 to tilt the uppermost plate 37 in a counterclockwise direction about the pin 39, as viewed in Figure 1. The uppermost closure plate 37, carrying the arm 63, in thus moving toward its open position as shown in Figure 1 carries with it the associated connecting rod 45 for effecting joint operation of the other closure plates 37 shown in Figure 2, in the manner hereinbefore explained. Each of the closure plates 37 is thus operated to uncover the associated auxiliary turbine exhaust opening 35, thereby diverting a portion of the turbine exhaust gases and dissipating to a proportionate degree the thrust of the gases flowing axially through the nozzle 14. With the forward or valve portions 37a of the closure plates 37 extending into the passage 13 while the guide portions 37b are correspondingly raised, as shown in Figure 3, the desired radial flow of the diverted turbine exhaust gases is insured. At the same time, since the closure plates 37 are hinged at the rearward sides of the respective openings 35, the pressure of fluid on the valve portions 37a will be effectively counter balanced by the pressure of the slip stream acting on the guide portions 37b. The closure plates 37 are thus maintained substantially balanced, so that the force necessary for operation thereof is minimized.

To effect closing operation of the several closure plates 37, the motor device 60 may be actuated to move the plunger 61 and link 62 rearwardly, until the valve portions of the jointly operative closure plates are brought into closing relation with the respective openings 35, through the medium of the connecting rods 45 and rotary spindle 50, as already explained.

From the foregoing it will be apparent that the improved thrust destroying closure plates and operating mechanism constructed in accordance with the invention may readily be installed in gas turbine apparatus of existing design for improving the operational characteristics thereof and for rendering available a wider range of control of thrust produced by the plant. By reason of the provision of an externally mounted motor device connected to the closure plates through the medium of a sturdy and simply constructed linkage system which is effectively protected from the heat of the exhaust gases, any tendency of the operating mechanism to stick or warp due to thermal stresses is minimized.

While the invention has been shown in but one form, it will be obvious to those skilled in the art that it is not so limited, but is susceptible of various changes and modifications without departing from the spirit thereof.

What is claimed is:

1. In a gas turbine power plant including an annular casing structure terminating in an axial nozzle for venting gases discharged from the turbine, means providing a plurality of auxiliary lateral discharge openings circumferentially spaced in said casing structure in advance of said nozzle, closure plates pivotally mounted in said openings and movable into the stream of turbine exhaust gases flowing toward said nozzle for diverting part of such gases into radial paths, and actuating means for simultaneously operating said closure plates comprising an axially disposed spindle element having radial lugs and journaled within said casing structure, connecting rods operatively connecting said radial lugs to the respective closure plates, and a motor device operatively connected to one of said closure plates.

2. In a gas turbine power plant including an annular casing structure terminating in an axial nozzle for venting gases discharged from the turbine, said casing structure having a hollow core structure mounted centrally therein adjacent said nozzle and a plurality of hollow radial struts for supporting said core structure, in combination, means providing a plurality of auxiliary lateral discharge openings circumferentially spaced in said casing structure in advance of said nozzle, closure members operatively mounted in said openings, said closure members being operative to divert gases through said openings for varying the proportionate flow to said nozzle, and actuating means for said closure members comprising a rotary spindle having a plurality of radial lugs and journaled within said core structure, a plurality of connecting rods extending through said struts, respectively, for operatively connecting said lugs with said closure plates, and a motor device operatively connected to one of said closure plates.

3. In a jet propulsion power plant including an annular casing structure having an axial nozzle for venting gases under pressure, means providing an auxiliary lateral discharge opening in said casing structure in advance of said nozzle, a closure member operatively mounted intermediate its ends in said opening, and actuating means for tilting said closure member partly into said opening for diverting gases through said opening and thereby varying the proportionate flow of gases through said nozzle, said actuating means comprising a spindle element operatively journaled in said casing structure and having a radial lug, and a link element operatively connecting said lug to said closure member.

CHARLES R. BROWN.

REFERENCES CITED

The following references are of record in the file of this patent:

UNITED STATES PATENTS

| Number | Name | Date |
|---|---|---|
| 340,237 | Nagel et al. | Apr. 20, 1886 |
| 1,493,280 | Rees | May 6, 1924 |
| 1,792,785 | Upton et al. | Feb. 17, 1931 |
| 2,418,488 | Thompson | Apr. 8, 1947 |